Patented Sept. 2, 1941

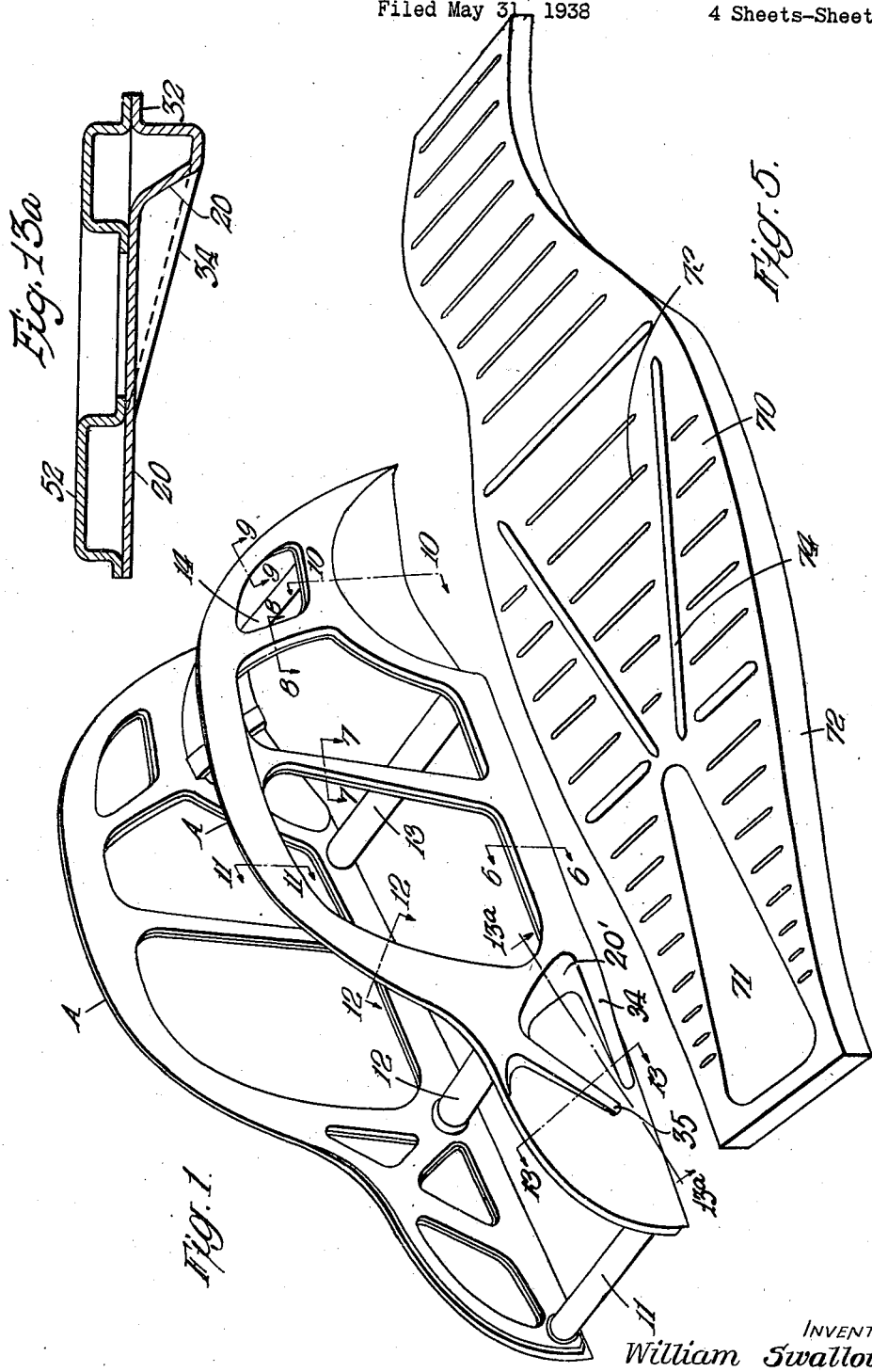

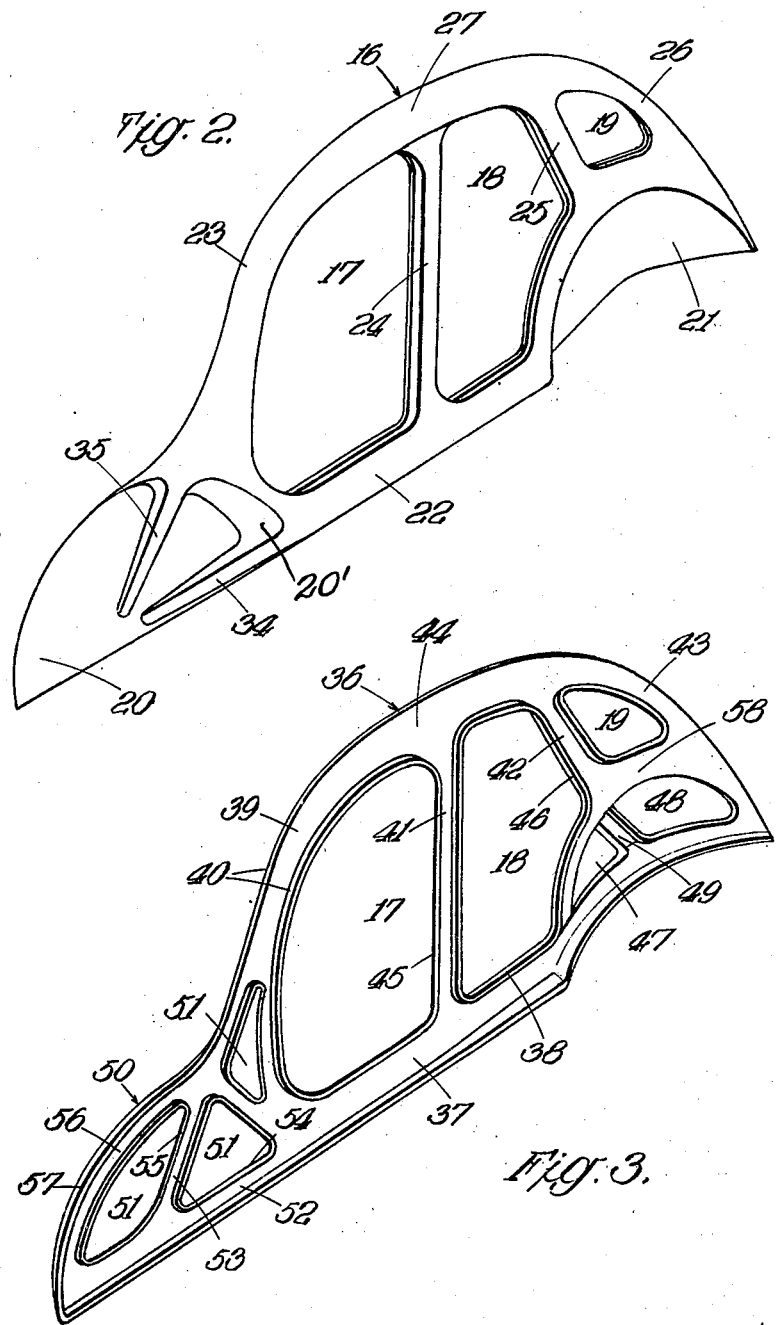

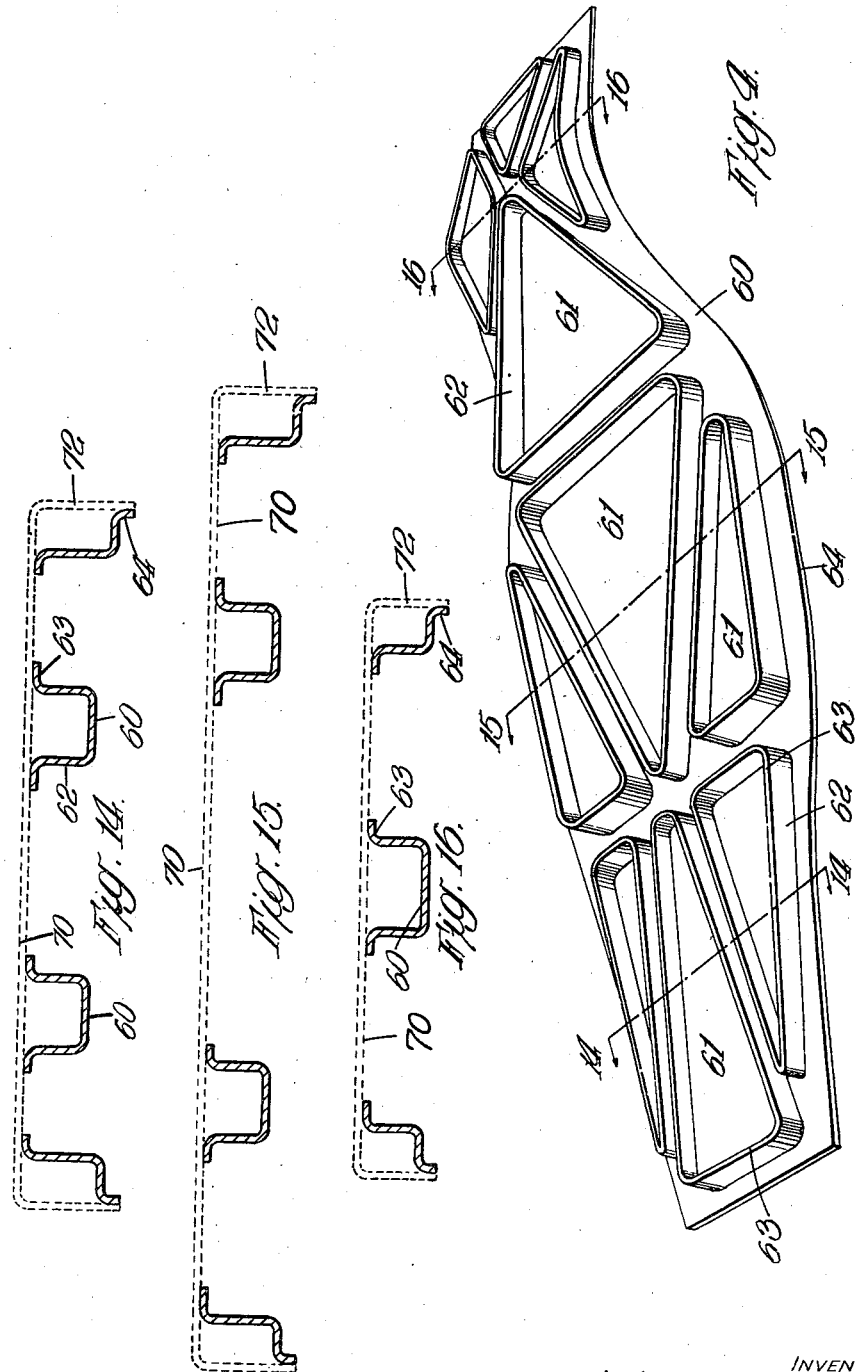

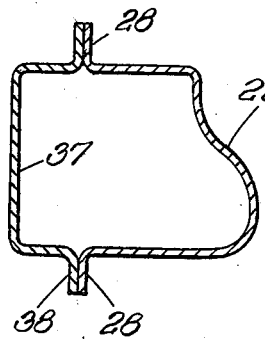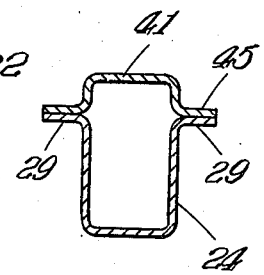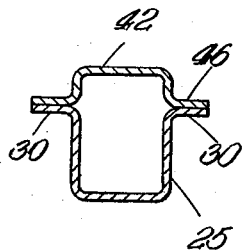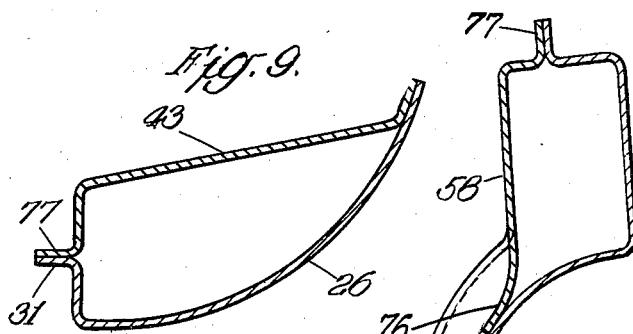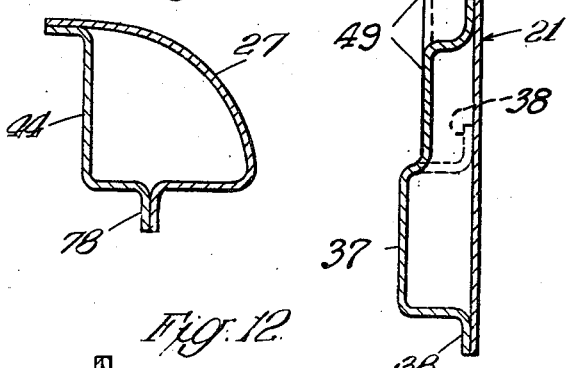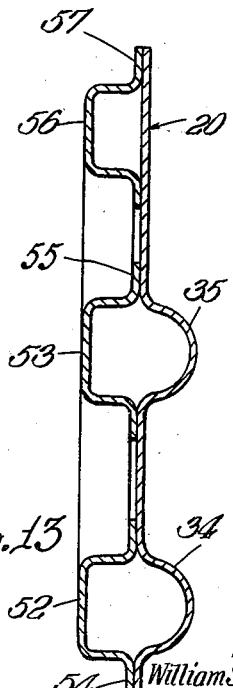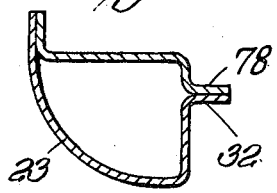

2,254,458

UNITED STATES PATENT OFFICE 2,254,458

VEHICLE

William Swallow, Headington, Oxford, England, assignor to Pressed Steel Company, Limited, Cowley, Oxford, England, a British company Application May 31, 1938, Serial No. 210,900
In Great Britain June 11, 1937

14 Claims. (Cl. 296—28)

The present invention relates to a sheet metal vehicle construction and is applicable equally to a vehicle comprised of separate body and chassis units, a vehicle of the so-called unitary body and chassis type and a vehicle of the so-called chassis-less type. Where thin sheet metal is used almost exclusively in the construction of a vehicle, primarily for the purpose of obtaining a construction having a relatively small overall weight as compared with constructions adopted hitherto, it is necessary to ensure that such a light weight construction possesses a strength and rigidity at least not less than, but preferably greater than, prior constructions. In light weight constructions the practice has been to provide open section members or portions of the structure which are closed by cover plates or the like to present a box section formation having the necessary degree of strength and rigidity.

The object of the present invention is to provide a sheet metal road vehicle construction of light weight in which the strength and rigidity is assured by the formation and disposition of the sheet metal panels or stampings entering into the structure without the addition of heavy reinforcing members or other framing.

According to the present invention a vehicle is built up of complementary sheet metal panels or stampings, which panels or stampings are formed with grooves or depressions, such that on assembly the grooves or depressions of complementary panels or stampings mate to present closed or box section members. The formation of the panels or stampings may be such that in specified regions of the vehicle the grooves or depressions constitute together a strong truss type reinforced area.

Such complementary conformations of the panels or shell fabric may be of a local character or alternatively persist throughout the structure to form a substantially jointless structural system. Complementary panels may be welded, riveted or bolted together. The complementary conformations in the panels may be of circular, rectangular, corrugated or other shape and further may be locally formed to provide seatings or connections for secondary structures or fittings or fitted with internal or external local reinforcements in the regions where localized stress cannot be avoided.

The invention is applicable particularly, though not essentially, to a vehicle of the unitary chassis and body type.

A unitary body and chassis type of vehicle might be defined as one in which the two elements of body and chassis, whilst necessary the one to the other, may be fabricated independently and each by itself is sufficiently strong to go through the process of manufacture without mishap, and to be handled and transported, if necessary, in the ordinary way but each is insufficiently strong in itself to provide the required degree of strength and rigidity in the complete vehicle.

It is only when the two elements are assembled together that the requisite strength and rigidity is derived.

The trend in modern vehicle design is toward this type of construction and further envisages a wall or panel structure which is carried forwardly to the extreme front end of the vehicle to embrace and support the motor.

The assembly, according to the invention, presents in effect a stressed skin structure in which the sheet metal panels resist, to a substantial extent, shear loads, and the various box or closed section members, formed by the combination of inner and outer panels or stampings serve to stabilise the stress resisting structure, to distribute the main loads, such as road spring reactions, engine torque and so forth and further promote the torsional resistance of the structure as a whole.

It may be found necessary to reinforce the structure locally for example by doubling plates and the like, at the regions of loading to relieve the stress intensity in those regions.

It is well known that structural members fabricated from sheet metal vary in efficiency with their sectional stability. In order, therefore, to obtain the lightest sheet metal structure, it is essential to have maximum sectional stability. Furthermore, when structural members are required to resist torsional loads, as in a vehicle body when it is being operated over uneven roads, the most desirable sections are tubes or enclosed box members, which are inherently resistant to torsion. Such a structure is provided by this invention.

Instead of a complete body shell being provided by complementary inner and outer panels, there may be provided two main side girder members each comprised of inner and outer complementary panels, which form the complete sides of the vehicle from front to rear. These side members would be interconnected by transverse tubes, X-bracing members, floor and roof panels and so forth to provide the desired enclosed body, and these interconnecting members would serve to transmit loads to the main side girder members.

One advantage of this kind of construction is the continuity which is obtained, that is to say, all the frame member junctions may be integral and free from any gussets, reinforcing plates or bolts or rivets.

One form of the invention is illustrated by way of example in the accompanying drawings, in which—

Figure 1 is a perspective view of assembled and interconnected main side units of a vehicle body;

Figure 2 is a perspective view of the near side outer panel or stamping; and

Figure 3 is a similar view of the complementary inner panel or stamping;

Figure 4 is a perspective view of the outer (lower) panel our stamping of a floor unit, which may serve as the chassis frame of the vehicle; and Figure 5 is a similar view of the complementary inner (upper) floor panel or stamping;

Figures 6 to 13a are sections on the lines 6—6, 7—7, 8—8, 9—9, 10—10, 11—11, 12—12, 13—13 and 13a—13a of Figure 1; whilst Figures 14 to 16 show in full lines sections on the lines 14—14, 15—15 and 16—16 of Figure 4, and in dotted lines sections through the inner (upper) floor panel in the corresponding region after its connection with the outer floor panel.

The body structure of the vehicle comprises two main side members or units A, extending from front to rear and interconnected for example in their lower regions by transverse tubular members 11, 12, 13 and 14, whilst in their upper regions, the side members would be interconnected by a roof panel (not shown) which might embody a sliding roof construction, which might be a one piece stamping extending from the rear end of the body forwardly over the whole roof area and down to the region of the cowl, such a stamping including windscreen and rear view window openings or such roof panel might be a built up structure of known form.

If desired the upper portions of the main side units may be interconnected by a structure composed of complementary inner and outer panels resembling the structure of the side units.

The outer panel of the side unit A is shown in Figure 2. It consists of a unitary stamping 16 (or it may be built up of a plurality of stampings), extending from the front to the rear of the vehicle, and formed with door and window openings 17, 18 and 19. At the front end, the stamping extends forwardly as at 20, to serve as the one portion of an engine housing and as a portion of a front wheel housing, whilst at the rear the stamping is formed with a wheel housing depression 21. At the rear end of the forward extension 20, a front wheel crown portion 20' is formed.

It will be seen that the side stamping 16 is in effect a lattice type girder, constituted by the threshold portion 22, the front post portion 23, the centre post 24, the rear post 25, the rear quarter 26 and the longitudinal roof header 27.

Each of the portions 22 to 27 is in the form of an inwardly presenting angle or channel section member, as can be seen clearly from Figures 6, 7, 8, 9 and 12 respectively, said channels being formed with flanges 28, 29, 30, 31 and 32 lying parallel with the general longitudinal plane of the stamping.

The forward extension 20 of the stamping 16 is formed with an inwardly presenting channel section depression 34 substantially in alignment with the threshold portion 22 of said stamping, the depression 34 tapering from a maximum depth in the region of the bottom of the front post of the side unit forwardly thereof. A second inwardly presenting channel section depression 35 is formed substantially in alignment with the front post portion 23 and tapering similarly the two depressions 34 and 35 converging towards each other and presenting a portion of a triangulated braced structure between the wall portions 20 and 20'.

The inner panel 36 is shown in Figure 3 having the same general configuration as the outer panel with door and window openings 17, 18 and 19 therein. The threshold portion 37 is generally of outwardly directed channel section, its lowermost edge being formed with a dependent flange 38 extending from front to rear of the stamping, the front post portion 39 is of similar section flanged as at 40 in a plane parallel with the general longitudinal plane of the stamping, the centre post 41, the rear post 42, the rear quarter 43 and the roof header 44 are also of outwardly directed channel section with edge flanges 45, 46, 77 and 78. In the wheel housing region the stamping 36 is cut away as at 47 and 48 to decrease the general weight of said stamping leaving an outwardly presenting flanged channel section strut 49 and a substantially horizontal strut 58, flanged at 76 for direct securement to the wheel housing portion 21 of the outer panel 16.

The forward extension 50 of the inner panel 36 is formed with lightening holes 51 so disposed that there is formed an outwardly presenting channel section portion 52 in substantial alignment with the threshold portion 37 and an inclined strut portion 53 in substantial alignment with the front post portion 39. A curved outwardly presenting flanged channel section portion 56 corresponds with the upper contour of the outer panel 16, the portions 52 and 53 being complemental to the portions 34 and 35 of the outer panel 16 and presenting when assembled therewith a braced triangulated truss type structure toward the front end of the vehicle. The struts 52, 53 and 56 are formed with edge flanges 54, 55 and 57 as appears clearly in Figure 13.

The underframe for the body structure described, is illustrated in Figures 4 and 5 and 14 to 16. This underframe comprises a lower stamping 60 contoured longitudinally to the shape of the lower margins of the body structure and formed with a series of openings 61, the margins around said openings being flanged vertically as at 62, said flanges being formed with small horizontal flanges 63, whilst the outer edges of the stamping 60 are formed with vertical flanges 64.

By this construction the lower stamping 60 presents the one portion of a truss type box section underframe, the box members being completed by attaching to the lower stamping 60 the upper stamping 70 of Figure 5, the attachment being effected, for example, by spot welding through the flanges 63 and 64 as appears clearly in figures 14 to 16. The upper stamping 70 is formed with a cut out 71 for reception of the motor and has dependent flanges 72 for attachment to the flanges 64 of the lower stamping 60. The stamping 70 may be formed with a series of transverse depressions 73 and if required oblique depressions 74 to give stability to said stamping.

The construction described above is applicable equally well to a vehicle embodying the conventional body and chassis unit or to a vehicle in which the chassis, as such, is entirely eliminated, that is to say, one in which the strength is derived solely from the body structure, and to which the motor, transmission and suspension systems are attached directly.

I claim:

1. An automobile body in which are provided complementary inner and outer sheet metal panels or stampings having a plurality of openings therein to form a lattice girder and each having a plurality of hollow section portions which are arranged to have their open sides face each other when assembled together, the inner and outer panels or stampings extending both to the end of the automobile and forming the side wall of a motor compartment.

2. In a vehicle body, a wheel housing portion comprising a substantially vertical side wall section and a crown section extending substantially transversely to said side wall section, a reinforcing groove or depression formed in said wheel housing having its open side facing toward the interior of the body and extending from said crown section into said side wall section.

3. In a vehicle body, a wheel housing portion comprising a substantially vertical side wall section and a crown section extending substantially tranversely to said side wall section, a groove or depression formed in said wheel housing and extending from said crown section substantially radially toward the center of the wheel housing.

4. In a vehicle body, a wheel housing portion comprising a substantially vertical side wall section and a crown section which extends substantially transversely to said side wall section, a groove or depression formed in said wheel housing and extending from the crown section into the side wall section, the depth of the groove or depression being greatest in the region of the crown section and decreasing in the direction toward the center of the wheel housing.

5. In a vehicle body, a wheel housing portion comprising a substantially vertical side wall section and a crown section which extends substantially transversely to said side wall section, a groove or depression formed in said wheel housing having its open side facing toward the interior of the body and extending in a direction from about the center of the wheel housing upwardly but inclined toward the transverse middle plane of the body.

6. In a vehicle body, a wheel housing portion comprising a substantially vertical side wall section and a crown section which extends substantially transversely to said side wall section, a groove or depression formed in said wheel housing adjacent its lower substantially horizontal margin, said groove or depression forming a continuation of an adjacent threshold section and decreasing in depth from the crown section toward the center of the wheel housing.

7. In a vehicle body, a wheel housing portion comprising a substantially vertical side wall section and a crown section extending substantially transversely to said side wall section, a reinforcing groove or depression formed in said wheel housing portion having its open side facing toward the interior of the body and extending from said crown section into said side wall section, a comparatively narrow elongated member being placed across the open side of said groove or depression and being fastened to said wheel housing portion along both sides of said groove or depression, said member forming together with said groove or depression a closed box sectional reinforcement.

8. In a combined body and chassis underframe structure for vehicles, a floor panel stamping having an uninterrupted floor surface, a second stamping being coextensive with a considerable part of said first-named stamping, said second stamping being in the form of a lattice-work of upwardly facing channels, the upper margins of the side walls of said channels being secured to the underside of said first-named stamping, said two stampings forming together a truss girder of high-load carrying capacity.

9. In a vehicle body, a wall comprising an inner panel and an outer panel, said panels being spaced from and arranged about parallel to each other, one of said panels having a section exposed to view in the finished body and free from openings, the other panel being in the corresponding region provided with an opening, means for connecting said two panels along the margins of said opening and means for connecting said two panels along lines which are spaced from and run about parallel to the margins of said opening as to form relatively narrow closed box sectional girders.

10. In a vehicle body, a wall comprising an inner panel and an outer panel, said panels being spaced from and arranged about parallel to each other, one of said panels having a section exposed to view in the finished body and free from openings, the other panel being in the corresponding region provided with an opening and with flanges along the margins of said opening, said flanges extending toward said first named panel and being connected therewith, and means for connecting said two panels along lines which are spaced from and run about parallel to the margins of said opening as to form relatively narrow closed box sectional girders.

11. In a vehicle body, a wall comprising an inner panel and an outer panel, said panels being spaced from and arranged about parallel to each other, one of said panels having a section exposed to view in the finished body and free from openings, the other panel being in the corresponding region provided with at least two openings, a comparatively narrow elongated portion of said second panel remaining between two adjacent openings, means for connecting said two panels along the margins of said openings, and means for connecting said two panels along lines which are spaced from and run about parallel to such margins of said opening which are not adjacent to another one of said openings as to form a lattice work of relatively narrow closed box sectional girders.

12. In a vehicle, a box-section longitudinal side frame member between front and rear wheels, a wheel housing for one of said wheels the longitudinally extending, substantially vertical side wall of the said wheel housing forming a box-section extension of the said longitudinal side frame member.

13. A vehicle having box-section longitudinal side frame members and wheel housings as well as box-section extensions of the side frame members wherein at least one wall of the said extensions constitutes a part of the longitudinally extending, substantially vertical side wall of the respective wheel housing.

14. A vehicle having a box-section longitudinal side frame member and a vertical wheel housing portion, in which said wheel housing portion forms a box-section extension of the side frame member the walls of the side frame member being formed in one piece with the walls of the wheel housing portion.

WILLIAM SWALLOW.